US011823293B2

(12) United States Patent
Winand et al.

(10) Patent No.: US 11,823,293 B2
(45) Date of Patent: *Nov. 21, 2023

(54) ENERGY RESOURCE NETWORK

(71) Applicant: INTELLIGENT ENERGY LIMITED, Loughborough (GB)

(72) Inventors: Henri Winand, Loughborough (GB); John Joseph Murray, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 147 days.

This patent is subject to a terminal disclaimer.

(21) Appl. No.: 17/589,674

(22) Filed: Jan. 31, 2022

(65) Prior Publication Data
US 2022/0156856 A1 May 19, 2022

Related U.S. Application Data

(63) Continuation of application No. 16/437,876, filed on Jun. 11, 2019, now Pat. No. 11,238,546, which is a (Continued)

(30) Foreign Application Priority Data

Mar. 24, 2015 (GB) ...................................... 1504946

(51) Int. Cl.
*G06Q 50/06* (2012.01)
*G06Q 20/06* (2012.01)
(Continued)

(52) U.S. Cl.
CPC ....... *G06Q 50/06* (2013.01); *G06Q 10/06315* (2013.01); *G06Q 20/065* (2013.01); (Continued)

(58) Field of Classification Search
CPC ............. G06Q 50/06; G06Q 10/06315; G06Q 20/065; G06Q 20/127; G06Q 20/145; (Continued)

(56) References Cited

U.S. PATENT DOCUMENTS 7,343,360 B1 * 3/2008 Ristanovic ............. G06Q 50/06
705/412
2002/0184138 A1 12/2002 Adamson
(Continued)

FOREIGN PATENT DOCUMENTS

| CN | 104320262 A | 1/2015 |
|---|---|---|
| EP | 3274945 A1 | 1/2018 |

(Continued)

OTHER PUBLICATIONS

Mihaylov et al. ("NRGcoin: Virtual Currency for Trading of Renewable Energy in Smart Grids", IEEE, Jul. 18, 2014, 6 pages) (Year: 2014).*

(Continued)

*Primary Examiner* — James D Nigh
(74) *Attorney, Agent, or Firm* — BAKER HOSTETLER LLP (57) ABSTRACT

An energy resource network with plurality of energy resources each capable of delivering a quantum of energy; and a plurality of energy-consuming-devices each capable of accepting a quantum of energy. Each energy resource is associated with an energy-resource-processor which is configured to issue one or more offer-messages in respect of a quantum of energy available for supply from the energy resource Each energy-consuming-device is associated with at least one energy-consuming-processor) that is configured to receive one or more offer-messages in respect of a transaction for receiving a quantum of energy from one of the energy resources The energy-resource-processor and/or (Continued)

the energy-consuming-processor being configured to issue a cryptographically-secured transaction record of the transaction for inclusion within a publicly-available distributed ledger.

20 Claims, 3 Drawing Sheets

Related U.S. Application Data continuation-in-part of application No. 15/077,763, filed on Mar. 22, 2016, now abandoned.

(51) Int. Cl.
| | |
|---|---|
| G06Q 20/12 | (2012.01) |
| G06Q 20/14 | (2012.01) |
| G06Q 20/18 | (2012.01) |
| G06Q 20/38 | (2012.01) |
| G06Q 30/02 | (2023.01) |
| G06Q 30/06 | (2023.01) |
| G06Q 40/04 | (2012.01) |
| G07F 15/00 | (2006.01) |
| H02J 3/38 | (2006.01) |
| H02J 13/00 | (2006.01) |
| H02S 99/00 | (2014.01) |
| G06Q 10/0631 | (2023.01) |
| H04L 9/06 | (2006.01) |
| G06Q 40/12 | (2023.01) |
| H04L 9/00 | (2022.01) |

(52) U.S. Cl.
CPC ......... *G06Q 20/127* (2013.01); *G06Q 20/145* (2013.01); *G06Q 20/18* (2013.01); *G06Q 20/3827* (2013.01); *G06Q 20/38215* (2013.01); *G06Q 30/02* (2013.01); *G06Q 30/06* (2013.01); *G06Q 40/04* (2013.01); *G06Q 40/12* (2013.12); *G07F 15/003* (2013.01); *H02J 3/388* (2020.01); *H02J 13/00007* (2020.01); *H02S 99/00* (2013.01); *H04L 9/0637* (2013.01); *H04L 9/0643* (2013.01); *G06Q 2220/00* (2013.01); *G06Q 2220/10* (2013.01); *H04L 9/50* (2022.05)

(58) Field of Classification Search
CPC ............. G06Q 20/18; G06Q 20/38215; G06Q 20/3827; G06Q 30/02; G06Q 30/06; G06Q 40/04; G06Q 40/12; G07F 15/003; H02J 3/388; H02J 13/00007; H02S 99/00

USPC .......................................................... 705/64
See application file for complete search history.

(56) References Cited

U.S. PATENT DOCUMENTS

| | | | |
|---|---|---|---|
| 2008/0231114 A1 | 9/2008 | Tolnar et al. | |
| 2009/0313103 A1 | 12/2009 | Ambrosio et al. | |
| 2010/0211812 A1 | 8/2010 | Bullen et al. | |
| 2012/0259760 A1 | 10/2012 | Sgouridis et al. | |
| 2014/0125125 A1* | 5/2014 | Wyatt | H02J 3/008 |
| | | | 307/18 |
| 2015/0026072 A1* | 1/2015 | Zhou | G06Q 20/401 |
| | | | 705/41 |
| 2016/0123620 A1* | 5/2016 | Orsini | H05K 7/20836 |
| | | | 700/276 |
| 2016/0284033 A1 | 9/2016 | Winand et al. | |
| 2017/0083989 A1* | 3/2017 | Brockman | G06Q 50/06 |
| 2018/0232819 A1* | 8/2018 | Stöcker | G01D 4/004 |

FOREIGN PATENT DOCUMENTS

| | | |
|---|---|---|
| GB | 2528505 A | 1/2016 |
| JP | 2003-324850 A | 11/2003 |

OTHER PUBLICATIONS

Li et al. ("Secure Information Aggregation for Smart Grids Using Homomorphic Encryption", IEEE, Jul. 30, 2010, pp. 327-332) (Year: 2010).*
Dimitriou et al. ("Privacy-Friendly Tasking and Trading of Energy in Smart Grids", ACM Dec. 14, 2012, 8 pages) (Year: 2012).*
Mihaylov et al. ("NRGcoin: Virtual Currency for Trading of Renewable Energy in Smart Grids", IEEE, Jul. 18, 2014 pages) (Year: 2014).
"Peer-to-peer energy: an opportunity for storage"; Energy Storage Report; http://energystoragereport.info/peer-to-peer-energy-storage-p2p/; accessed Apr. 9, 2015; Jan. 21, 2015; 4 pages.
GB Search Report and Written Opinion dated Sep. 7, 2016, issued in GB Application No. 1504946.3.
NRGcoin: Virtual Currency for Trading of Renewable Energy in Smart Grids; IEEE, Jul. 18, 2014, 6 pages (Year: 2014).
Andreas M. Antonopoulos; "Mastering Bitcoin—Unlocking Digital Crypto-Currencies"; O'Reilly; Copyrgt. 2010; 282 pages.
International Patent Application No. PCT/GB2016/050798; Int'l Preliminary Report on Patentability; dated Oct. 5, 2017; 9 pages.
"Bitcoin Development Guide—Blockchain"; https://www.chainnode.com/tutorial/1758; Nov. 2014; accessed Mar. 16, 2022; 4 pages.
Melanie Swan; "Blockchain—Blueprint for a New Economy"; O'Reilly; @2015; 149 pages.

* cited by examiner

ENERGY RESOURCE NETWORK

CROSS REFERENCE TO RELATED APPLICATIONS

This application claims priority to U.S. application Ser. No. 16/437,876, filed on Jun. 11, 2019, which claims priority to U.S. application Ser. No. 15/077,763, filed on Mar. 22, 2016, which claims priority to foreign application GB 1504946.3, filed Mar. 24, 2015, the contents of which are incorporated herein by reference as fully set forth herein.

TECHNICAL FIELD

The disclosure relates to energy resource networks and in particular energy transactions between energy resources and energy-consuming-devices.

BACKGROUND

In existing energy distribution networks, such as electrical power distribution networks, electrical power is commonly distributed to end users or energy consumers by an energy supplier who obtains electrical power from one or more electricity generators. The system is generally centralised in that each energy consumer's usage is metered and recorded by the energy supplier, who invoices the energy consumers for the power used. The energy supplier simultaneously secures supplies of energy from the one or more electricity generators for delivery of power to the energy consumers.

Local generation of electrical energy by energy consumers themselves, for example by domestic-scale solar panels or wind turbines etc may be transferred to the network, for example by compensating meter readings for that energy consumer which are transmitted to the energy supplier.

A significant increase in interest in decentralised power generation and distribution, for example using many smaller scale local power generation units, may require alternative strategies for enabling more localised and distributed control, monitoring and implementing of energy exchange.

SUMMARY

Aspects of some exemplars include an energy resource network comprising: a plurality of energy resources each capable of delivering a quantum of energy; a plurality of energy-consuming-devices each capable of accepting a quantum of energy; each energy resource being associated with an energy-resource-processor configured to issue one or more offer-messages in respect of a quantum of energy available for supply from the energy resource; each energy-consuming-device being associated with an energy-consuming-processor configured to receive one or more offer-messages in respect of a transaction for receiving a quantum of energy from one of the energy resources; and the energy-resource-processor and/or the energy-consuming-processor being configured to issue a cryptographically-secured transaction record of the transaction for inclusion within a publicly-available distributed ledger.

The energy resource network may further comprise a plurality of third party nodes, each configured to locally store and maintain the publicly-available distributed ledger. The third party nodes may each be configured to identify, and store locally, a correct version of the publicly-available distributed ledger as the version of the publicly-available distributed ledger that is most commonly stored on the plurality of third party nodes.

The energy resource network may further comprise a third party node configured to: perform a verification routine on one or more cryptographically-secured transaction records (for example using a public key); and only add the one or more cryptographically-secured transaction records to the publicly-available distributed ledger if the verification routine is successful.

The third party node may be configured to perform the verification routine by processing the publicly-available distributed ledger in order to determine whether or not an energy resource associated with the transaction has sufficient energy to perform the transaction. The third party node may be configured to perform the verification routine by processing the publicly-available distributed ledger in order to determine whether or not an energy resource associated with the transaction has sufficient energy-generating capacity (which may be referred to as power) available to perform the transaction.

The publicly-available distributed ledger may comprise a balance of available energy-generating capacity or energy available for each energy resource. The third party node may be configured to determine whether or not an energy resource associated with the transaction has sufficient available energy-generating capacity or energy to perform the transaction by comparing at least part of the transaction record with the balance of available energy-generating capacity or energy available for the energy resource associated with the transaction.

The publicly-available distributed ledger may comprise a plurality of blocks of data, wherein each block of data comprises information representative of: one or more transaction records; and a cryptographic hash value of at least a part of a previous block in the ledger. The publicly-available distributed ledger may comprise a block chain.

The energy resource network may further comprise a third party node configured to: process one or more cryptographically-secured transaction records; and determine a new block of data for the publicly-available distributed ledger by determining the cryptographic hash value by applying a hash algorithm to at least a part of a previous block in the publicly-available distributed ledger.

The third party node may be configured to determine the cryptographic hash value by applying the hash algorithm to: at least a part of an immediately preceding block in the ledger; the one or more transactions; and a cryptographic nonce value.

The third party node may be configured to: generate cryptographic hash values for a plurality of different cryptographic nonce values; identify a determined cryptographic hash value as valid if it satisfies one or more predetermined characteristics; and broadcast a new block of data, comprising the valid cryptographic hash value, for inclusion in the publicly-available distributed ledger.

The part of the immediately preceding block in the ledger may be the cryptographic hash value of the immediately preceding block in the ledger. One or more of: the issue of offer-messages by the energy resource via the network; an acceptance of offer-messages by the energy consuming devices; an issue of acceptance-messages by the energy consuming devices in acceptance of an offer-message; processing of acceptance-messages by a third party for inclusion in a cryptographically-secured, publicly-available distributed ledger of acceptance-messages; and a physical exchange of energy between the energy resource and the energy consuming device; may be controlled based on a cryptographically-secured, publicly-available distributed ledger of acceptance-messages and/or a cryptographically-secured, publicly-available distributed ledger of transactions.

The energy-resource-processors may be configured to automatically issue an offer-message if an available amount of energy (for example, energy-available-value), or an available capacity for providing energy (for example, power-rating), exceeds a high-energy-threshold level.

The energy-consuming-processors may be configured to automatically accept or reject an offer-message by comparing one or more pieces of information of the offer-message with one or more predetermined acceptance-criteria.

The processor of each energy-consuming-device or each energy resource may be configured to generate the cryptographically-secured transaction record using a private key.

The transaction record may comprise information representative of an acceptance of the quantum of energy and/or a debit of an account associated with the energy-consuming-device.

Each offer-message may comprise information representative of one or more of: a quantum of energy; a generating capacity of the energy resource; a time window; a price.

The energy-resource-processor of each energy resource may be configured to issue a cryptographically-secured offer record for inclusion within a publicly-available distributed ledger.

The energy resource network may further comprise a metering apparatus. The metering apparatus may be configured to generate a cryptographically-secured transaction record of metered units of energy transferred between an energy resource and an energy-consuming-device counterparties.

There may be provided an energy-consuming-device configured to consume quanta of energy from one or more energy resources, the energy-consuming-device comprising: optionally, a load device; an energy-consuming-processor configured to: (i) receive offer-messages in respect of quanta of energy available for supply from one or more energy resources; and (ii) in response to accepting an offer-message in respect of a transaction for receiving a quantum of energy from one or more of the energy resources, issue a cryptographically-secured transaction record of the transaction for inclusion within a publicly-available distributed ledger.

There may be provided an energy resource configured to deliver quanta of energy to one or more energy-consuming-devices, the energy resource comprising: an energy-resource-processor configured to: (i) issue offer-messages in respect of quanta of energy available for supply from the energy resource; and (ii) in response to having an offer-message in respect of a transaction for delivering a quantum of energy to an energy-consuming-device accepted, issue a cryptographically-secured transaction record of the transaction for inclusion within a publicly-available distributed ledger.

There may be provided a device for updating a publicly-available distributed ledger for an energy resource network, the network comprising: a plurality of energy resources each capable of delivering a quantum of energy; a plurality of energy-consuming-devices each capable of accepting a quantum of energy; each energy resource being associated with an energy-resource-processor configured to issue one or more offer-messages in respect of a quantum of energy available for supply from the energy resource; and each energy-consuming-device being associated with an energy-consuming-processor configured to receive one or more offer-messages in respect of a transaction for receiving a quantum of energy from one of the energy resources; wherein the device is configured to receive, from the energy-resource-processor and/or the energy-consuming-processor, a cryptographically-secured transaction record of the transaction and include said record within a publicly-available distributed ledger.

There may be provided a method of operating an energy resource network, the energy resource network comprising: a plurality of energy resources; and a plurality of energy-consuming-devices; wherein the method comprises: an energy resource issuing one or more offer-messages in respect of a quantum of energy available for supply from the energy resource; an energy-consuming-device receiving one or more offer-messages in respect of a transaction for receiving a quantum of energy from one of the energy resources; and issuing a cryptographically-secured transaction record of the transaction for inclusion within a publicly-available distributed ledger.

There may be provided a computer program, which when run on a computer, causes the computer to configure any apparatus, including an energy resource network, an energy resource, an energy-resource-processor, an energy-consuming-device, an energy-consuming-processor, a third party node, a circuit, controller, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Aspects of Embodiments of the present disclosure will now be described by way of example and with reference to the accompanying drawings in which.

The disclosure and the following further disclosure are exemplary and explanatory only and are not restrictive of the disclosure, as defined in the appended claims. Other aspects of the present disclosure will be apparent to those skilled in the art in view of the details as provided herein. In the figures, like reference numerals designate corresponding parts throughout the different views. All callouts and annotations are hereby incorporated by this reference as if fully set forth herein.

DETAILED DESCRIPTION OF ILLUSTRATIVE EMBODIMENTS

Figure 1:
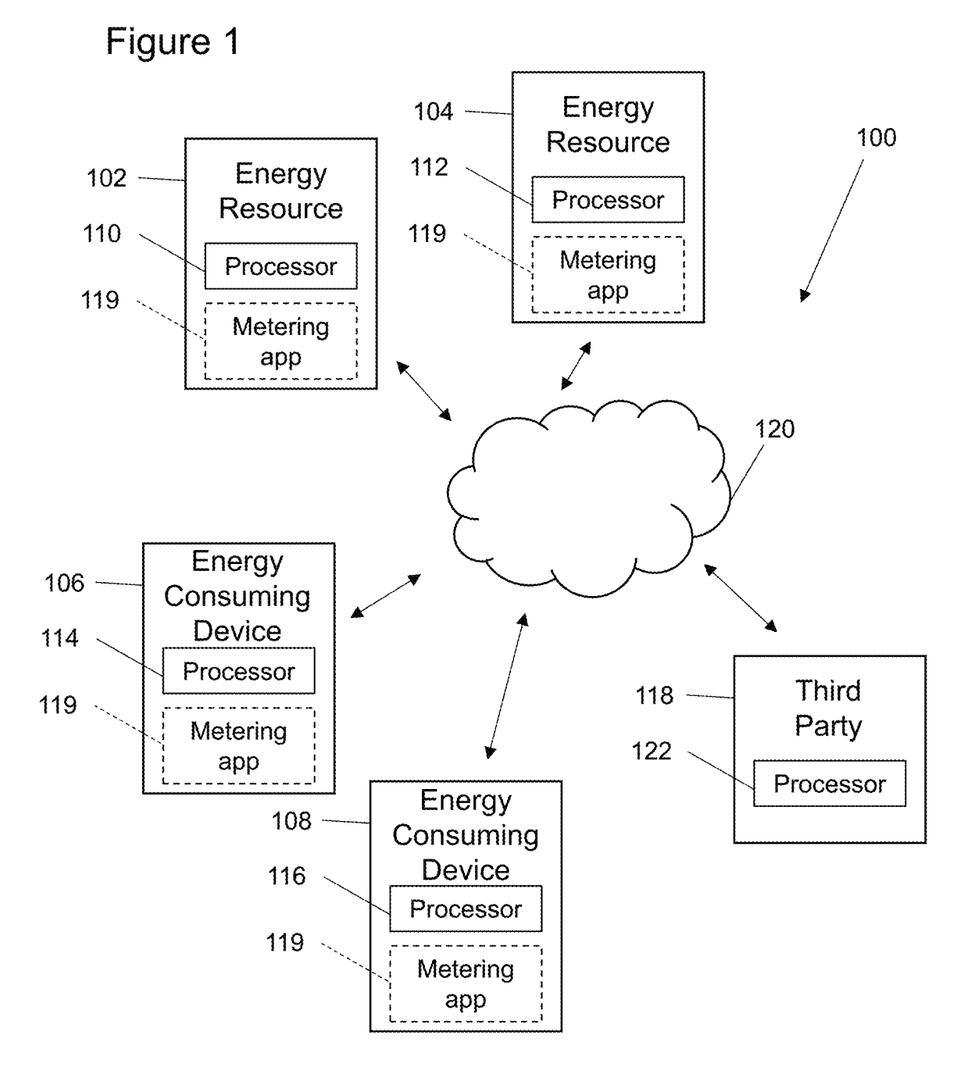
FIG. 1 shows an energy resource network.

FIG. 1 shows an energy resource network 100, which includes a first energy resource 102, a second energy resource 104, a first energy-consuming-device 106 and a second energy-consuming-device 108. It will be appreciated that the energy resource network 100 can include any number of energy resources and any number of energy-consuming-devices. The energy resources 102, 104 can deliver a quantum of energy, and the energy-consuming-devices 106, 108 can accept/consume a quantum of energy.

A purpose of the energy resource network 100 is to enable an energy-consuming-device 106, 108 to acquire energy from an energy resource 102, 104, in a peer-to-peer manner, and to provide an accurate representation of how energy is exchanged in the network. As will be discussed in more detail below, this can be achieved by recording transactions on a publicly-available distributed ledger. Use of such a distributed ledger can remove, or reduce, any disadvantages associated with a centralised recordal system and can maintain a high integrity of the data stored in the ledger. In this way, an alternative system for facilitating one or more aspects of controlling, monitoring and implementing energy exchange between energy generators and energy consumers can be provided.

The energy-consuming-device 106, 108 and the energy resource 102, 104 are in data communication through a data exchange network 120, such as the internet, or any other communications network including Bluetooth, Wi-Fi, etc.

The energy resources 102, 104 can be any resource that is capable of supplying an amount of energy at a given time. An energy resource 102, 104 may have a known power-rating, which can be considered as a capacity for supplying energy. The energy resource 102, 104 could be a conventional power station (gas, oil, coal, nuclear, etc.) having a well-defined capacity for providing energy at any given period of time; a renewable energy supply (wind, solar, tidal, etc.) having a variable capacity at any given period of time; or an alternative generator system such as hydrogen-based fuel cells, pumped storage etc. Hydrogen-based fuel cells and fuel cell stacks can have a known capacity for providing energy. For example, a hydrogen-based fuel cell may have a power-rating that is determined by a number of fuel cells in a fuel cell stack, and the size of an active area of the fuel cells. Some energy resources 102, 104 may have a defined, but not constant over time, capacity for providing energy (power-rating) based on environmental conditions, for example a wind turbine's power-rating may be based on wind speed.

The energy resources 102, 104 can also have an energy-available-value, which defines an amount of energy that is available for supply. For energy resources 102, 104 that consume a fuel, such as a hydrogen-based fuel cell stack, the energy-available-value may define a quantity of fuel that the fuel cell stack has access to.

The energy-consuming-devices 106, 108 can be any apparatus, device or network that is capable of consuming energy, or providing an electrical load to an energy resource 102, 104 within a specified time period. An energy-consuming-device can be a portable computing device, such as a mobile telephone, a smartphone, a tablet computer or a laptop computer. In some examples the energy-consuming-device 106, 108 may be, or may include, an energy storage system such as a battery. The energy-consuming-devices 106, 108 can also provide the functionality of an energy resource in some examples.

The first and second energy resources 102, 104 have associated energy-resource-processors 110, 112. It will be appreciated that the energy-resource-processors 110, 112 need not necessarily be co-located with the associated energy resources 102, 104. The energy-resource-processors 110, 112 can issue one or more offer-messages in respect of a quantum of energy available for supply from the associated energy resource 102, 104. For example, a user associated with an energy resource 102, 104 may provide input to the energy-resource-processors 110, 112 representative of a desire to provide energy to an energy-consuming-device 106, 108.

In some examples, the energy-resource-processors 110, 112 may automatically issue an offer-message if an available amount of energy (energy-available-value), or an available capacity for providing energy (power-rating), exceeds a high-energy-threshold level. In some examples, such offer-messages may be issued in response to the receipt of an energy-request-message from an energy-consuming-device 106, 108. The automatic exchange of such messages can enable an effective and efficient energy network to be maintained.

The offer-message can be completely public, for example broadcast to an entire network, or can broadcast only to a subset of energy-consuming-devices 106, 108.

The offer-message may include information representative of one or more of:
- an identifier of the energy resource 102, 104 making the offer;
- an identifier of one or more energy-consuming-devices 106, 108 to which the offer is made. This can allow personalised/non-public offers to be made;
- a quantum of energy being offered, which may be:
  - an amount of energy that is being offered;
  - an available generating capacity that is being offered;
  - a generating capacity of the energy resource 102, 104, which in some examples can be used as the quantum of energy being offered;
- a start time, an end time, and/or a time window during which the offer is valid;
- a price; and
- a proposed transaction record, which is described in more detail below.

A quantum of energy specified in an offer can represent an ability to draw on a specified maximum number of watts (an instantaneous load value) for the duration of a specified time period or could be a total amount of energy to be delivered over a specified time period, whether or not the energy transfer actually takes place either in part or in full. The specified period may or may not have a predetermined end time.

In some examples, the offer-message can be cryptographically secured so that recipients can confirm the identity of the energy resource 102, 104 that is making the offer. That is, the energy-resource-processor 110, 112 can encrypt the offer-message using a private key associated with the energy-resource-processor 110, 112 and/or associated with a user of the energy resource 102, 104. This can advantageously secure the integrity of the offer-message.

In some examples, cryptographic securing of public offers from energy resources 102, 104 could be digitally signed by secure modules that check or confirm the integrity of the energy resource, its maximum capacity, its market authorisation, etc.

The first and second energy-consuming-devices 106, 108 have associated energy-consuming-processors 114, 116. Again, the energy-consuming-processors 114, 116 need not necessarily be co-located with the associated energy-consuming-devices 106, 108. The energy-consuming-processors 114, 116 can receive and process one or more offer-messages that are received from energy resources 102, 104. This processing may involve displaying to a user of the energy-consuming-device 106, 108 one or more of the pieces of information that is included in the offer-message. The user of the energy-consuming-device 106, 108 can then provide input to the energy-consuming-processor 114, 116 indicative of a desire to accept or reject the offer.

In some examples, the energy-consuming-processor 114, 116 may be configured to automatically accept or reject the offer by comparing one or more of the above pieces of information in the offer-message with one or more predetermined acceptance-criteria. In this way, the energy-consuming-processors 114, 116 can automatically accept one or more offers in respect of a transaction for receiving a quantum of energy from one of the energy resources.

If the offer is rejected, then the energy-consuming-processor 114, 116 may send an offer-rejection message to the energy resource 102, 104 that made the offer. Alternatively, the energy-consuming-processor 114, 116 may simply ignore the offer-message by not responding to it, if it rejects the offer.

If the offer is accepted, then the energy-consuming-processor 114, 116 may send an offer-acceptance-message to the energy resource 102, 104 that made the offer. The offer-acceptance-message may include information representative of one or more of:
- an identifier of the energy-consuming-device 106, 108 that accepts the offer;
- an identifier of the energy resource 102, 104 that made the offer;
- a quantum of energy that has been accepted, which may be:
  - an amount of energy; or
  - a generating capacity of the energy resource 102, 104;
- a start time, an end time, and/or a time window during which the offer is accepted;
- a price; and
- a proposed transaction record, which is described in more detail below.

In some examples, the offer-acceptance-message can be cryptographically secured so that recipients can confirm the identity of the energy-consuming-device 106, 108 that is accepting the offer. That is, the energy-consuming-processor 114, 116 can encrypt the offer-acceptance-message using a private key associated with the energy-consuming-processor 114, 116 and/or associated with a user of the energy-consuming-device 106, 108. This can advantageously secure the integrity of the offer-acceptance-message.

In some examples, the same types of information can be included in the offer-message and the offer-acceptance-message, but with different values. For example, an energy-consuming-processor 114, 116 may make a conditional acceptance of an offer, for example conditional upon a revised price being acceptable to the energy-resource-processor 110, 112. In this way, the energy-consuming-processor 114, 116 can modify one or more of the pieces of information received in an offer-message and send the modified information back to the energy-resource-processor 110, 112 as part of an offer-acceptance-message. This can enable a user of the energy-consuming-device 106, 108 to indicate an acceptance of a whole or a part of an offered quantum of energy from an energy resource, optionally during or for a given time period.

If the offer is accepted, then either or both of the energy-consuming-processor 114, 116 and the energy-resource-processor 110, 112 can generate a transaction record using information from the offer-message and/or acceptance-message. The transaction record can encode an acceptance of the quantum of energy and/or can be used to debit an account associated with the energy-consuming-device 106, 108. The transaction record can include information representative of one or more of:
- an identifier of the energy resource 102, 104 that is to deliver the energy;
- an identifier of the energy-consuming-device 106, 108 that is to receive the energy;
- a quantum of energy that is to be delivered, which may be:
  - an amount of energy that is being offered;
  - an amount of generating capacity of the energy resource 102, 104;
  - an amount of generating capacity of the energy resource 102, 104 that remains unallocated;
- a start time, an end time, and/or a time window during which the quantum of energy that is to be delivered; and
- a price.

In some examples, energy may be delivered by the energy resource to the energy-consuming-device through a USB connection, optionally a bi-directional USB connection.

In this example, the energy-consuming-processor 114, 116 and/or the energy-resource-processor 110, 112 can issue a cryptographically-secured transaction record of the transaction. For example, one or both of the processors can encrypt the transaction record using a private key to generate the cryptographically-secured transaction record, wherein the private key is unique to a registered user of the energy resource 102, 104 or a user of the energy-consuming-device 106, 108, or is unique to the associated hardware/device.

The cryptographically-secured transaction record can be broadcast to the network 120 such that it is accessible by all nodes/devices in the network 120. A single third party node 118 is shown in FIG. 1, with an associated third-party-processor 122. As will be discussed below, the third-party-processor 122 can be programmed to include details of a transaction that is represented by the cryptographically-secured transaction record within a publicly-available distributed ledger. In practice, there can be a plurality, and often a great many, third party nodes that are competing to be the first node to add the transaction to the ledger. Optionally, the third-party-processor 122 can also verify the transaction, and only include details of the transaction within the publicly-available distributed ledger if the verification is successful.

The functionality of including the transaction on the ledger, and optionally verifying the transaction, may be performed in a similar way to how Bitcoin transactions are processed before being added to a block chain. Such processing can be implemented in a number of different ways, for example depending upon the type of transaction, as discussed below.

Figure 2:
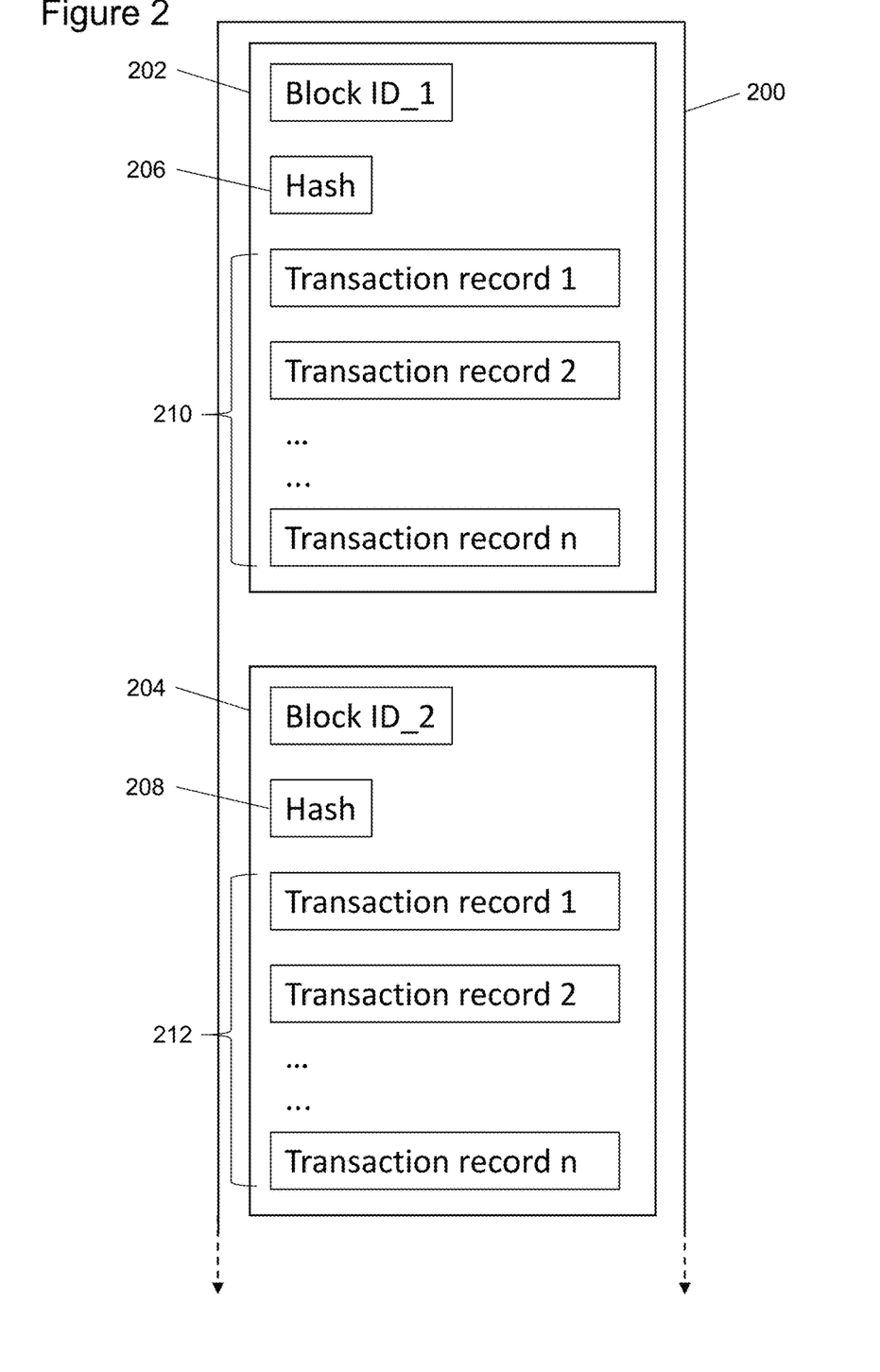
FIG. 2 shows schematically an example of a publicly-available distributed ledger.

FIG. 2 shows schematically an example of information that can be included in blocks 202, 204 of a publicly-available distributed ledger 200, which can be used with at least some of the examples disclosed herein. The ledger 200 can be locally stored and maintained by a plurality of, and in some examples all, nodes in the network, which is why it is referred to as distributed. As will be discussed below, when a new block 202, 204 is to be added to the ledger 200, it is distributed to all nodes in the network for inclusion in their local copy of the ledger 200. In the event that two new blocks are identified by different parties at similar times and are broadcast for inclusion in the ledger 200, then the new block that is accepted into the ledger 200 will be the block that has been added to the majority of the local copies of the ledger 200, in particular by the majority of nodes at the time that the next block is to be added. In this way, an accepted new block is defined by a consensus/majority of the nodes in the network. As will be discussed below, an approximate time delay between successive blocks 202, 204 being added to the ledger 200 can be defined by setting the computational complexity of operations that must be performed before a new block can be added.

FIG. 2 shows a first block 202 of data and a second block 204 of data. Each of the first and second blocks of data 202, 204 include information representative of one or more transactions 210, 212, and a cryptographic hash value 206, 208. The cryptographic hash value 206, 208 is the result of the application of a cryptographic hash function/algorithm that has been applied to at least a part of a previous block in the ledger 200. Use of the cryptographic hash value 206, 208 can mean that the blocks 202, 204 are linked together in a defined sequence, with each block linked to an earlier block by the hash. In this example, the ledger 200 can be referred to as a block chain because it includes a plurality of blocks of data, that are "linked together" to define a chain. Also, it is not possible to begin processing the second block 204 until the first block 202 has been accepted into the ledger 200 because determination of the hash value 208 for the second block 204 requires details of at least part of the first block 202.

As is known in the art, a hash algorithm can be applied to an arbitrarily-large amount of data (such as the previous block) in order to provide a fixed-length hash value. The same fixed-length hash value will always result from the same arbitrarily-large amount of data. Over time, new blocks of data are added to the end of the block chain in order to publicly record new transactions. Each new block is guaranteed to come after the previous block chronologically because the new block's hash value cannot be calculated until the previous block is accepted into the ledger 200. Also, each block 202, 204 is computationally impractical to modify once it has been accepted into the ledger 200 because every block 202, 204 after it would also have to be regenerated.

The cryptographic hash value 208 of the second block 204 can be determined by applying a hash function to:
- at least a part of a previous block 202 in the ledger 200. The previous block 202 may be the immediately preceding block. The part of the previous block 202 may be the hash value 206 of the immediately preceding block 202;
- the one or more transactions 212 (of the current block 204); and
- a cryptographic nonce value (not shown).

A third-party-processor that receives details of the one or more transaction records 212, and intends to add a new block 204 to the ledger 200, must first determine a cryptographic hash value 208 that satisfies one or more predetermined characteristics before the new block 204 can be added to the ledger 200. That is, a new block 202, 204 cannot be added to the ledger 200 until a valid cryptographic hash value 208 has been determined. This process can be referred to as "mining" and the third-party-processor may be referred to as a "miner". The one or more predetermined characteristics may be a specified number of leading zero bits, as is the case with the block chain that is associated with Bitcoins. The third-party-processor can apply the hash algorithm using different cryptographic nonce values until a valid cryptographic hash value 208 with the predetermined characteristics is achieved. In response to determining the valid cryptographic hash value 208 with the predetermined characteristics, the third-party-processor can generate a new block 204 that includes at least the cryptographic hash value 208 and the associated transaction records 212, and then broadcast/distribute the new block 204 to all nodes in the network for inclusion in their local copies of the ledger 200.

It will be appreciated that different third party processors may simultaneously be trying to identify a new block based on different transaction records; that is, the transaction records identified for inclusion in the ledger 200 by each third party processor need not necessarily be the same. As indicated above, in the event that two potential new blocks are identified by different third party processors at similar times, then the accepted new block is defined by a consensus of the nodes in the network. The computational requirements of generating the hash value 208 with the predetermined characteristics dictates that the next block cannot be added too soon after the previous block so that there is sufficient time for the previous block to be distributed throughout the network and a consensus to be determined as to which of the two blocks is to be accepted into the ledger 200.

As the processing power of computers increases over time, the computational complexity of arriving at a valid hash value 208 can be increased by changing the required predetermined characteristics. For example, the number of leading zeros required of the hash value 208 can be increased. In this way, the requirements of the cryptographic hash value 208 dictates a time delay between successive blocks 202, 204 being added to the ledger 200. The length of the time delay can be defined by the computational complexity required to satisfy the requirements of the cryptographic hash value 208.

In some implementations, the third party processors may be rewarded for successfully adding a block 202, 204 to the ledger. For example, one or both of the energy resource and the energy-consuming-device may pay a transaction fee to the specific third party processor that successfully adds an associated transaction record to the ledger 200. Such a transaction fee may only be paid upon confirmation that the transaction record has been added to a minimum number of locally-stored copies of the ledger 200. This can reduce the likelihood that a transaction fee is paid to a third party processor that generates a candidate block for adding to the ledger 200, only for it to be dismissed because another block, generated at a similar time, is accepted as valid by a majority of third party processors.

The information representative of one or more transactions 210, 212 can include information derived from the transaction records discussed above with reference to FIG. 1.

The third party processors, in determining a new block for adding to the ledger 200, may also perform verification processing on the transactions in order to determine whether or not the transactions should be included in the ledger 200. In one example, a verification routine can include comparing any seemingly unverified transactions with transactions 210, 212 that are already present in the ledger 200. This can prevent a single transaction being recorded in the ledger 200 twice because the verification routine will fail for a transaction that is not already present in the ledger 200.

Another verification routine can include checking that an energy resource has sufficient available energy or capacity to satisfy a transaction, as will be discussed below.

Use of ledger, such as the one described with reference to FIG. 2, can provide accurate visibility of how energy is exchanged between various devices. That is, the ledger can represent the real-world energy characteristics of devices, and accurately display how those characteristics change over time. In some examples, a distributed nature of the ledger, and a requirement for a consensus on the accuracy of the ledger, can provide the required accuracy, and integrity in the data on the ledger. Optionally, the integrity of the data on the ledger can be further improved by implementing the ledger as a plurality of blocks of data, wherein each block of data comprises a cryptographic link to a previous block in the ledger. Another option to improve the integrity of the data on the ledger is to only accept data onto the ledger after it has successfully passed a verification routine.

A further advantage to using a publicly-verified distributed ledger is that the information on the ledger can be considered trustworthy, for example because transactions are only recorded if the ledger is indicative of the fact that the energy resource has the requisite capacity to provide the amount of energy that has been offered, such as within a specified time widow.

Public verifiability of the encrypted ledger can also provide a basic mechanism for an energy "market"—users of energy resources can see how much resource is available within the (global) network and set a price accordingly; users of energy-consuming-devices can also see how much resource is available within the network and the pricing, and can then decide to buy or not buy according to need.

A publicly-verifiable, cryptographically-secured record of the transaction, or acceptance of the offer, can serve as a non-repudiatable commitment to the transaction by an energy-consuming-device. This could be a precursor to a separate payment mechanism that operates subsequently, or could include an actual payment mechanism itself, if the public ledger also serves as an "energy currency" in similar manner to Bitcoin.

A publicly-verifiable, cryptographically-secured transaction record or the acceptance-message can in some examples be supplemented by a further cryptographically-secured record of the actual energy transfer. That is, a cryptographically-secured "meter reading". This could be provided by tamper-proof metering hardware, such as a smart meter. Any such cryptographically-secured meter readings or records of actual completed energy transfers can in some examples assist in a downstream payment system.

A publicly-verifiable, cryptographically-secured ledger can be data-mined by third parties for analysing trends in energy consumption, energy usage, potential demand, matching between energy resources and energy-consuming-devices; pricing etc.

A publicly-verifiable, cryptographically-secured ledger can be data-mined by third parties to verify that an energy resource has capacity to provide the quantum of energy associated with an offer that it has made, based on earlier transactions that are recorded on the ledger. The transaction may only be recorded on the ledger if the verification is successful.

In some examples, the acceptance-messages and/or the offer-messages described above can also be included within the ledger of FIG. 2, or another ledger. This or these ledgers can enable public visibility of "consumption" (for example booking or reservation) of available energy resource in a given time period, in some examples before the event of energy transfer or before the event of an energy-consuming-device going "on load" to an energy resource. By providing public visibility of this acceptance, a market can be able to respond to remaining available energy resource capacity in the network, for example by re-pricing the remaining available energy resource.

Inclusion of offer-messages in the ledger of FIG. 2, or a different ledger, can enable a market to respond to available energy offers, and it can help to prevent disruptive offers from energy resources that are not in fact capable of delivering because the ledger is publicly visible and is secure in that historical information in the ledger cannot be readily manipulated.

In some examples the acceptance-messages may be included with the ledger of FIG. 2, or another ledger. The acceptance-message may include a time frame for completing the energy transaction, which is also recorded in the ledger. On sending of an offer-message by an energy resource 102, 104 or receipt of an offer-message by an energy consuming device, the ledger of acceptance-messages may be used to determine whether said offer-message comprises a valid offer and therefore control whether or not said offer-message can be accepted with an acceptance-message. As a public, distributed ledger is used to verify offers made by energy resources 102, 104 it reduces the risk or removes the risk of an energy resource committing to offers of energy that cannot be fulfilled, such as within the specified time-window. Accordingly, an energy resource may be prevented from offering more energy than they can supply at a particular time or in a particular time window, as the publicly-verifiable, cryptographically-secured ledger of acceptance messages can be used to control the issue of offer-messages by the energy resource via the network; the acceptance of offer-messages by the energy consuming devices; the issue of acceptance-messages by the energy consuming devices; or the processing of acceptance-messages by the third party.

For example, if the third party refuses to process the acceptance message into the ledger because the offer of energy could not be fulfilled by the energy resource, an attempt to physically exchange energy may be prevented because a record of the acceptance-message is not present in the publically verifiable, cryptographically-secured ledger of acceptance messages.

Further, a public, cryptographically-secured distributed ledger of energy transactions may also be used to control the issue or acceptance of offer-messages. In particular, an energy consuming device or third party or energy resource may compare a public ledger of acceptance-messages and a public record of energy transactions to determine which energy transfers have been accepted but not fulfilled to determine an outstanding transaction parameter. The sending of offer-messages or acceptance of offer messages as valid or the sending of acceptance-messages may be controlled by the outstanding transaction parameter, which may ensure that energy resources do not over commit to the supply of energy that they may not be able to fulfil.

The use of the publicly-verifiable, cryptographically-secured ledgers (of energy transactions, offer-messages and/or acceptance-messages) to control the issue of offer-messages by the energy resources, the acceptance of offer-messages as valid by the energy consuming devices, the issue of acceptance-messages by the energy consuming devices, the recording of transaction-messages in a transaction ledger by either the energy consuming device, energy resource or third party, and/or the physical energy exchanges may provide for a more secure system, as discussed in more detail below.

Returning to FIG. 1, one or more energy-resource-managing-entities (not shown) may store details of authorised energy-resources 102, 104. An energy-resource-managing-entity can store a database that includes details of one or more of:
  an identifier of an energy resource 102, 104;
  a power-rating of the energy resource 102, 104; and
  in some examples, an amount of energy that the energy resource 102, 104 can make available for supplying to an energy-consuming-device 106, 108.

A publicly-available distributed ledger may be automatically updated when changes are made to an energy-resource-managing-entity's database. For example, when a new energy resource 102, 104 is commissioned or its power-rating changes, the new information may be automatically transferred onto the publicly-available distributed ledger. In some examples, this can be implemented by the energy-resource-managing-entity sending an energy-resource-update-message for public verification in the same way as transaction records, as discussed above.

Transacting Energy Generating Capacity (Power)

In some examples, the energy resource 102, 104 may offer some or all of its energy generating capacity. The publicly-available distributed ledger may include an entry that indicates the maximum energy generating capacity (power-rating) of each energy resource 102, 104. This entry may be made when an energy resource 102, 104 is commissioned, for example. A subsequently issued transaction record may therefore be publicly verifiable because any third party 118 can process the ledger to determine whether or not the energy resource 102, 104 has sufficient unreserved capacity to supply the energy required to satisfy the transaction. The acceptance by an energy-consuming-device 106, 108 of such an offer may be publicly recorded on the publicly-available distributed ledger so that it can be processed in order to verify any subsequent transactions involving the energy resource 102, 104 before the subsequent transactions are recorded in the ledger.

In some examples, the ledger (optionally each block in the ledger) comprises a balance of available energy-generating capacity (power) and/or an energy-available-value for each energy resource 102, 104. The third party 118 can then determine whether or not an energy resource 102, 104 associated with the transaction has sufficient available energy-generating capacity (power) or available energy to perform the transaction by comparing at least part of the transaction record with the balance of available energy-generating capacity or energy-available-value for the energy resource 102, 104 that is associated with the transaction.

In one example, Party A is an energy resource, Party B is an energy-consuming-device, and Party C is another energy-consuming-device. Party A has a 10 kW capacity (power-rating) fuel cell stack, which is recorded on the ledger. This initial adding of the power-rating of Party A to the ledger may be performed in an authorised or authenticated way. At some time in the future, Party A sells 7 kW of capacity to Party B, and a corresponding transaction record is generated. This transaction record can be publicly verified with reference to the ledger because Party A is shown as having enough capacity available. Therefore the transaction of 7 kW from Party A to Party B is recorded on the ledger. Then, at some future point in time whilst Party B has reserved 7 kW of Party A's capacity, Party A tries to sell 4 kW to Party C. When the transaction record for this transaction is made available for public verification and inclusion in the ledger, the transaction is not verified because the verification routine will recognise from the ledger history that Party A only has 3 kW capacity available. Therefore the transaction to Party C will not be recorded on the ledger because it has not successfully passed the verification routine.

In some examples, either the energy resource 102, 104 or the energy-consuming-device 106,108 may submit a further transaction record to end a transaction. In the above example, this may involve Party B transferring the 7 kW capacity back to Party A, optionally for no cost.

As discussed above, transaction records can in some examples include an end time for a transaction, after which an energy-consuming-device should relinquish its energy consumption. In which case, the public verification will also require a check of the power-rating available during specific periods of time defined by a proposed transaction, and also earlier recorded transactions.

Transacting Available Energy

In some examples, the energy resource 102, 104 may offer some or all of its available energy. If the energy resource 102, 104 is or includes a fuel cell stack, then the amount of available energy may be defined by the amount of hydrogen fuel that is available to the fuel cell stack. In this example, the system may use a public ledger that is not necessarily publicly-verifiable or encrypted. A purpose of the public ledger is to make publicly available all transactions of energy in a network. The acceptance by an energy-consuming-device 106, 108 of an offer to supply energy is recorded on the public ledger so that it can be processed when verifying any subsequent transactions involving the energy resource 102, 104. In the same way as discussed above, the energy resource 102, 104 and/or the energy-consuming-device can send a transaction record for including in the public ledger. A transaction record can be sent before and/or after the energy is exchanged.

A post-energy-exchange-transaction record may include one or more of the following types of information, which can be included on the public ledger:

- an identifier of a corresponding pre-energy-exchange-transaction record, which can enable the two records to be linked together in the ledger;
- an identifier of the energy resource 102, 104 that delivered the energy;
- an identifier of the energy-consuming-device 106, 108 that consumed the energy;
- a quantum of energy that was agreed to be supplied, which may be:
  - an amount of energy; or
  - an amount of generating capacity of the energy resource 102, 104;
- a quantum of energy that was actually supplied, which may be:
  - an amount of energy that was supplied; or
  - an amount of generating capacity of the energy resource 102, 104 that was used by the energy-consuming-device 106, 108;
- a difference between the quantum of energy that was agreed to be supplied, and the quantum of energy that was actually supplied;
- a start time, an end time, and/or a time window during which the quantum of energy that is to be delivered;
- an agreed price;
- an amount of money that was actually paid;
- a difference between the agreed price and the amount of money that was actually paid;
- a score for the energy resource 102, 104, for example a mark out of 10 that has been provided by a user of the energy-consuming-device 106, 108 after the energy has been supplied; and
- a score for the energy-consuming-device 106, 108, for example a mark out of 10 that has been provided by a user of the energy resource 102, 104 after the energy has been supplied.

The quantum of energy that was actually supplied may be provided by a smart meter, such as metering application software 119 associated with either or both of the energy resource 102, 104 and the energy-consuming-device 106, 108. Such information may be cryptographically-secured.

A public ledger that includes some or all of the above information can provide another basic mechanism for an energy "market"—users of energy-consuming-devices 106,

108 can monitor details of previous energy-supply-transactions that have been engaged in by specific energy resources 102, 104 within the (global) network and determine from which of the energy resources they wish to source their energy for a new transaction. Also, such an energy market can enable energy resources 102, 104 to set a price of energy for their future transactions. It will be appreciated that other advantages of the publicly verifiable encrypted ledger that are discussed above can also be achieved by the public ledger discussed in this example.

Examples disclosed herein can relate to a system for monitoring energy transactions and providing a transparent platform for people to engage in such energy transactions. This can improve visibility of what energy exchanges are really taking place, and can also define standard protocol for monitoring and recording transactions/energy exchanges.

Figure 3:
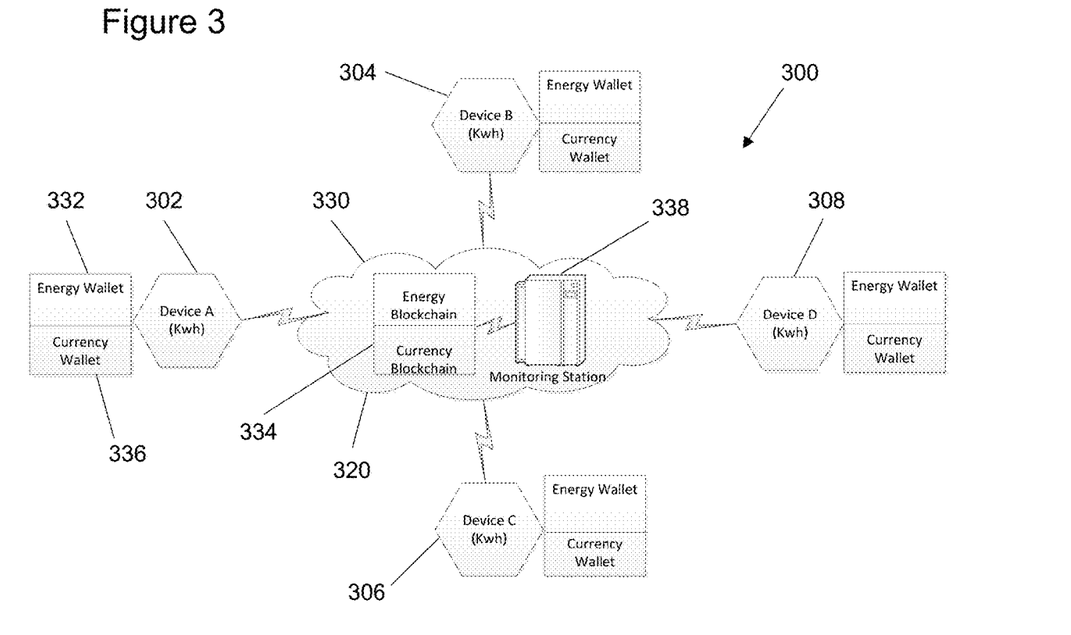
FIG. 3 shows another energy resource network.

FIG. 3 shows an exemplary embodiment of another energy resource network 300, which includes Device A 302, Device B 304, Device C 306 and Device D 308. The devices are in data communication with each other through the internet 320, which is an example of a data exchange network.

Consider that Device A 302 has surplus energy, and Device B 304 has depleting energy. Each device has an associated unique identifier through which it can transact over a secure area of the Internet (which is illustrated schematically as network 320 in FIG. 3). Depending upon various parameters such as location, time of year, geographical demand, etc. Device A 302 can fix up a price for a unit of energy. Device B 304 can see the price set by Device A 302 and can send a request for buying 'n' units of energy. If agreed, an equivalent amount of money is transferred from Device B 304 to Device A 302. The transaction can be in any standard currency or cryptocurrency like Bitcoin.

This transaction can be recorded in a block that will then be added to an energy block chain 330. The transaction details can include information such as the identity of the parties involved, amount of energy purchased, amount of energy left with Device A 302 and Device B 304, etc.

Now consider two other devices, Device C 306 and Device D 308, which are also energy deficient. Device A 302 has an option to sell energy to Device B 304, Device C 306, Device D 308, or all. There can now be an auction to obtain the energy from Device A 302 where the highest bidder wins the auction. There can be a limit on maximum bid one can raise. Again such a transaction can be recorded on the energy block chain 330.

Each device 302, 304, 306, 308 can have two associated wallets (similar to Bitcoin wallets), an energy wallet 332 keeping a count of energy and a currency wallet 336 keeping a count of currency. These wallets 332, 336 can be linked with two respective ledgers on the Internet 320; the energy block chain 330 and a currency block chain 334.

A monitoring station 338 can also be connected to the internet 320, such that it can track the transactions on the energy and currency block chains 330, 334. In this way, the monitoring station 338 can analyse the trend in energy consumption and data related to energy usage habits of the users. Such information can be used to seek potential energy providers, buyers, match right users, determine maximum pricing, etc.

Examples described herein relate to a decentralised energy exchange. A device with spare energy can directly engage in a transaction with a requesting power deficient device to provide requested units of energy. The transaction can be recorded in a public ledger. Several blocks of such transactions can form an energy block chain. That is, a block chain of energy exchange can be provided.

Energy transactions can be recorded and managed in a new way, for example by a decentralised transaction platform with central monitoring. Various advantages include:
  No, or reduced, dependency on a central energy provider;
  Option of choosing a preferred energy provider anytime;
  Flexibility and transparency in payment;
  No regulation on prices;
  Transparent record of transactions;
  Only pay when using (no need to pay bills when you are not at home for long time); and
  Generation of rich user data for various purposes.

Examples disclosed herein can enable energy producing/consuming devices to engage in energy sharing transactions through a transparent and decentralised platform. Similar to Bitcoins transactions being logged in a block chain (which is a public ledger), all energy transactions can be recorded in an energy block chain. If an energy source is a fuel cell stack, then the amount of energy (KWhs) can be limited by a lifespan of the stack, or an amount of fuel available, or an amount of energy generating capacity available. This can be analogous to limited Bitcoins in circulation. This limited availability of resource can be used to dictate the rules of such transactions, such as pricing and amount of energy available in a set period of time. Since the energy block chain will have a record of all energy transactions and the devices involved, it can be used for driving a whole ecosystem of peer to peer energy distribution.

In accordance with the various systems and examples discussed above, the energy resource network may be applied to a range of application, including, but not limited to, residential solar panels, network operator energy trading, wall plugs, and fuel cell systems.

Residential solar panels can be installed and act as an energy resource 104 consistent with energy network embodiments described herein. For example, solar panels can generate energy to act as an energy resource, and the produced energy is delivered to the energy resource network similar to the processes described with respect to FIGS. 1-3. In embodiments, the solar panels can be provided with a computing device, having a processor and metering app to determine the amount of energy produced. In examples, the produced energy can be consumed, in part, by one or more devices, e.g., metering devices associated with the solar panel, and excess energy can be measured and subsequently delivered to one or more energy consuming devices. Energy consuming devices can include storage units, electrical lighting, heating and cooling devices, and other residential/household devices, and generally provide power to the residential unit upon which the solar panels were installed.

The metering apps on the solar panel can assist in determining one or more characteristics of energy delivery, such as a time of delivery, where to deliver the energy, which device to deliver the energy, and how much energy to deliver. In accordance with embodiments herein, the metering app can send characteristics of the generated energy to a network 120, which analyses the production and consumption of the plurality of energy resources and energy consuming devices in the network. For example, the network can analyse data from each solar panel on the residential unit, or on a plurality of residential units, e.g., a neighbourhood. The network, which is also in communication with one or more energy consuming devices, can determine energy demands and delivery timing. For example, energy demands for electricity may be higher in the evenings than during the day or night time. The network can determine the proper, and even optimum time of delivery, in view of currently available energy, and peak times of energy generation. Consequently, the network and third party nodes work in unison to process energy transaction and deliver energy from the resource to the energy consuming devices.

The various network determinations can occur through the use of one or more third party nodes 118, in which energy transactions have and will be recorded through the publicly-available distributed ledger. As discussed herein, the transaction records can be publicly available and provide information regarding when sufficient energy is available for certain transactions and match up resources and consumers to optimize delivery and consumption.

In an embodiment, network level energy trading can occur, wherein a plurality of district network operators can form a web network for energy trading. In such an embodiment, a plurality of energy resource networks can be combined to form an expanded network through which energy can be traded and distributed. Each district network operator may be responsible for determining the overall energy consumption and requirements of its network, as well as communicate with other district network operators to negotiate, deliver, and receive energy in accordance with the supply and demand of each network. This can be particularly useful in expanding the reach of each network and ensuring an efficient delivery, cost, and use of each network and its components.

In another example embodiment, which can be utilized in accordance with the residential solar panels discussed above, a wall plug can be introduced into the energy resource network to either or both provide information about energy consumption, and assist in monitoring such consumption. For example, the wall plug can comprise an energy monitor, which can record the amount of energy withdrawn by one or more devices, i.e., energy consuming devices, connected to the plug. The energy monitor can further deliver information to network 120 and include details regarding the energy transaction. Such details include but are not limited to the amount of energy (kwH) withdrawn, a time and/or length of withdrawal, the type of energy consuming device, etc. Accordingly, the wall plug can act as an intermediary device to promote efficient energy transactions and consumption information.

In embodiments, the energy monitor can further compile and analyse pricing data. For example, available energy and energy prices can fluctuate throughout the day. For certain household devices, which may always be "plugged in", or consuming energy at a low level state, even when powered off, e.g., televisions and computers, it may be desirable to cut off power during periods of low energy demand, or even unnecessary demands. In another example, consumers may desire that high energy consuming devices, such as an A/C unit, be limited during peak pricing periods, or periods where there is less energy available for distribution. The energy monitor can analyse such pricing and consumption trends to determine an optimal, and cost efficient, delivery schedule.

The wall plug embodiment may be particularly desirable in that it acts as an intermediary between the energy resources and energy consuming devices, and can provide energy consumption and availability data related to both aspects of the energy resource network. In embodiments, the wall plug is in communication with the server 120 and consequently the third party nodes upon which data analysis is completed.

Similarly, energy resource networks can be utilized with fuel cell systems comprising one or more fuel cell stacks. For example, a plurality of fuel cell stacks can each be monitored similar to the solar panel and wall plug embodiments discussed above. Excess available energy can be monitored and distributed to various energy consuming devices Each of the solar panel, wall plug, and fuel cell devices can be incorporated into one or more embodiments of the energy resource networks discussed herein. In various embodiments, these products can be utilized in different validation mechanisms, improve failure tolerance concerns of the system, and increase monetary value and consumption.

For example, when controllers dynamically receive availability messages from an energy resource and adjust the resulting offer to energy consumers, the overall system becomes more fault tolerant. In a network of energy resources and energy consuming devices linked by a controller, e.g., similar to those discussed with respect to solar panel and wall plug embodiments, the threshold for the energy consuming devices to accept offer messages from the controller can be tuned to ensure that the combined energy demand never exceeds the network's available energy resource.

In an example wherein an energy supplier or resource goes off-line due to climactic or other conditions that lead to a decrease in available energy (e.g., solar panels are not generating energy on a cloudy, rainy day, nightfall, or a physical device failure), the controller can modify the energy offer messages to reflect the relative scarcity of the available energy quanta. This can be done, for example, by reducing the quantity of offer messages sent by the controller, of by increasing the monetary value associated with the energy quanta in the offer message. The thresholds of the energy consumers may constrain some the consumers from purchasing the energy quanta in this new state. This ensures that the network supplies energy to the most critical energy consumers as defined by the thresholds of each consumer.

In the example of a residential setting where the energy providers may be a renewable energy source, such as rooftop photovoltaic panels, an electricity grid and a domestic battery system. The energy consumers may be an alarm system, an air conditioning system, etc. Accordingly, the thresholds of each can be set so that upon a reduced availability of energy, the threshold for the air conditioning system to accept an availability offer message from the controller device is not met, while the threshold of the alarm system is indeed met. As such, various systems can be prioritized based on one or more of energy demands, energy availability, and consumer preference.

Such prioritization and fault tolerances can apply across a wide range of embodiments. For example, a fuel cell system. If one or more fuel cells become degraded, the system can ensure that safety critical consumers such as fans, which ensure hydrogen dilution to prevent explosive mixtures as a result of exhaust are prioritized over pumps, which provide oxidant to the fuel cell stack.

Each of the above examples can be utilized with various validation mechanisms used by the third party node and ledger. That is, energy resource and consumption transactions can be recorded and confirmed through methods utilizing proof of work, proof of stake, and proof of authority. In a proof of work model, various nodes are competing to validate transactions for addition onto the public ledger. Since numerous nodes are tackling the same computational problem, the computational cost can be extremely high and efficiency of this method can be low. In a proof of stake model, a single node is selected to create a new entry in the publicly available ledger, depending on the amount ("stake") invested by the node. Accordingly, the computational cost of such a system is less than the proof of work model. In a proof of authority model, transactions may be completed based on a particular identity. Given that transactions between energy resources and energy consuming devices are determined and recorded on a publicly available ledger, the efficiency of such transactions greatly depend upon the efficiency of the recordation of such transactions, and some validation methods may be more desirable than others, depending on the embodiment and the size of the energy resource network. For example, while the solar panels may utilize a proof of work model, a proof of stake or proof of authority validation model can be preferred due to the lower energy and computational cost required compared to the proof of work model.

It will be understood that various aspects or details of the invention(s) may be changed without departing from the scope of the disclosure and invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention(s).

What is claimed:

1. An energy system comprising:
    an energy resource device capable of delivering a quantum of energy, the energy resource device comprising a computing device having a processor configured to determine a quantum of energy available for supply and generate an offer message indicative of the quantum of energy available;
    an energy-consuming device capable of accepting the quantum of energy from the energy resource device and comprising a processor configured to determine an available energy capacity and generate a cryptographically-secure energy request message;
    a publicly-available distributed ledger comprising a plurality of data blocks, wherein each data block comprises information indicative of a cryptographic hash value of at least a part of a previous data block in the ledger;
    a remote computing device in communication with the energy resource device and the energy-consuming device, wherein the at least one remote device manages the publicly-available distributed ledger and facilitates an energy transaction between the energy resource device and the energy-consuming device.

2. The energy system of claim 1, wherein the energy resource device is at least one of: a solar panel, a wind turbine, a power station, or a fuel cell.

3. The energy system of claim 1, wherein the energy-consuming device is at least one of: a storage unit, a lighting device, a heating device, a cooling device, a mobile computing device, or a battery.

4. The energy system of claim 1, wherein the remote computing device is further configured to facilitate the energy transaction by at least:
    monitoring offer messages from the energy resource device and energy request messages from the energy-consuming device;
    analyzing energy consumption within the energy system; and
    facilitating delivery of offer messages and energy request messages between the energy resource device and the energy-consuming device.

5. The energy system of claim 1, further comprising a second remote computing device in communication with the first computing device, configured to locally store and maintain the publicly-available distributed ledger.

6. The energy system of claim 1, wherein the publicly-available distributed ledger comprises a block chain.

7. The energy system of claim 1, wherein the transaction record comprises information representative of at least one of an acceptance of the quantum of energy or a debit of an account associated with the energy-consuming device.

8. The energy system of claim 1, wherein each offer-message comprises information representative of one or more of: a quantum of energy; a generating capacity of the energy resource; a time window; a price.

9. A method for operating an energy system, comprising:
    receiving at least one of a cryptographically-secure offer message indicative of a quantum of energy available at an energy resource device, or a cryptographically-secure energy request message indicative of an available energy capacity at an energy-consuming device capable of receiving energy from the energy resource device;
    managing, at a computing device in data communication with the energy resource device and the energy-consuming device, a publicly-available distributed ledger comprising a plurality of data blocks, wherein each data block comprises information indicative of a cryptographic hash value of at least a part of a previous data block in the ledger; and
    facilitating an energy transaction between the energy resource device and the energy-consuming device.

10. The method of claim 9, further comprising:
    performing a verification routine on one or more cryptographically-secured transaction records; and
    adding the one or more cryptographically-secured transaction records to the publicly-available distributed ledger if the verification routine is successful.

11. The method of claim 10, wherein performing the verification routine comprises at least one of:
    processing the publicly-available distributed ledger in order to determine whether or not an energy resource associated with the transaction has sufficient energy to perform the transaction; or
    processing the publicly-available distributed ledger in order to determine whether or not an energy resource associated with the transaction has sufficient energy-generating capacity available to perform the transaction.

12. The method of claim 9, further comprising at least one of:
    automatically issuing an offer-message if an available amount of energy, or an available capacity for providing energy, exceeds a high-energy-threshold level; or
    automatically accepting or rejecting an offer-message by comparing one or more pieces of information of the offer-message with one or more predetermined acceptance-criteria.

13. The method of claim 9, wherein the energy resource device is at least one of: a solar panel, a wind turbine, a power station, or a fuel cell.

14. The method of claim 9, wherein the energy-consuming device is at least one of: a storage unit, a lighting device, a heating device, a cooling device, a mobile computing device, or a battery.

15. A computer program product comprising a non-transitory computer readable storage medium having instructions stored thereon which, when executed by a processor, cause the computer program product to:

receive at least one of a cryptographically-secure offer message indicative of a quantum of energy available at an energy resource device, or a cryptographically-secure energy request message indicative of an available energy capacity at an energy-consuming device capable of receiving energy from the energy resource device;

manage, at a computing device in data communication with the energy resource device and the energy-consuming device, a publicly-available distributed ledger comprising a plurality of data blocks, wherein each data block comprises information indicative of a cryptographic hash value of at least a part of a previous data block in the ledger; and facilitate an energy transaction between the energy resource device and the energy-consuming device.

16. The computer program product of claim 15, further comprising instructions that cause the computer program product to at least:

process one or more cryptographically-secured transaction records; and, determine a new block of data for the publicly-available distributed ledger by determining the cryptographic hash value by applying a hash algorithm to at least a part of a previous block in the publicly-available distributed ledger.

17. The computer program product of claim 15, wherein the energy resource device is at least one of: a solar panel, a wind turbine, a power station, or a fuel cell.

18. The computer program product of claim 15, wherein the energy-consuming device is at least one of: a storage unit, a lighting device, a heating device, a cooling device, a mobile computing device, or a battery.

19. The computer program product of claim 15, wherein the transaction record comprises information representative of at least one of an acceptance of the quantum of energy or a debit of an account associated with the energy-consuming device.

20. The computer program product of claim 15, wherein each offer-message comprises information representative of one or more of: a quantum of energy; a generating capacity of the energy resource; a time window; a price.

* * * * *